US 9,165,215 B2

(12) United States Patent
Wei

(10) Patent No.: US 9,165,215 B2
(45) Date of Patent: Oct. 20, 2015

(54) METHOD OF FAST IMAGE MATCHING

(71) Applicant: DELTA ELECTRONICS, INC., Taoyuan Hsien (TW)

(72) Inventor: Juang-Yu Wei, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 230 days.

(21) Appl. No.: 13/869,471

(22) Filed: Apr. 24, 2013

(65) Prior Publication Data

US 2014/0212052 A1 Jul. 31, 2014

(30) Foreign Application Priority Data

Jan. 25, 2013 (TW) ................................. 102102775

(51) Int. Cl.
*G06K 9/62* (2006.01)

(52) U.S. Cl.
CPC .................................... *G06K 9/6206* (2013.01)

(58) Field of Classification Search
None
See application file for complete search history.

(56) References Cited

U.S. PATENT DOCUMENTS

| | | | | |
|---|---|---|---|---|
| 4,046,476 A * | 9/1977 | Charamella et al. | ............ | 355/77 |
| 4,736,437 A * | 4/1988 | Sacks et al. | ................... | 382/216 |
| 6,185,343 B1 * | 2/2001 | Ikeda et al. | ................... | 382/291 |
| 7,027,511 B2 * | 4/2006 | Wang et al. | ............... | 375/240.16 |
| 7,242,806 B2 * | 7/2007 | Johnson et al. | ............... | 382/209 |
| 7,551,783 B2 * | 6/2009 | Johnson et al. | ............... | 382/209 |
| 7,660,455 B2 * | 2/2010 | Yamamoto et al. | ............ | 382/141 |
| 8,411,997 B2 * | 4/2013 | Iwamoto | ........................ | 382/289 |
| 8,718,837 B2 * | 5/2014 | Wang et al. | ........................ | 701/2 |
| 2002/0122595 A1 * | 9/2002 | Crill | ............................... | 382/211 |
| 2002/0126917 A1 * | 9/2002 | Akiyoshi et al. | ............... | 382/300 |
| 2003/0012442 A1 * | 1/2003 | Hashimoto et al. | ........... | 382/218 |
| 2003/0128207 A1 * | 7/2003 | Sawada | .......................... | 345/419 |
| 2004/0095611 A1 * | 5/2004 | Watanabe et al. | ............. | 358/3.26 |
| 2004/0146202 A1 * | 7/2004 | Hyoki | ............................ | 382/209 |
| 2004/0151379 A1 * | 8/2004 | Kim et al. | ....................... | 382/209 |
| 2005/0225553 A1 * | 10/2005 | Chi | ................................. | 345/474 |
| 2006/0088191 A1 * | 4/2006 | Zhang et al. | ................... | 382/107 |
| 2006/0098217 A1 * | 5/2006 | Chang et al. | .................... | 358/1.9 |
| 2006/0123343 A1 * | 6/2006 | Shimokawa | ................... | 715/712 |
| 2006/0140486 A1 * | 6/2006 | Kondo et al. | ................... | 382/224 |
| 2006/0274956 A1 * | 12/2006 | Sohn et al. | ..................... | 382/238 |
| 2007/0172150 A1 * | 7/2007 | Quan et al. | ..................... | 382/298 |
| 2007/0237397 A1 * | 10/2007 | Johnson et al. | ............... | 382/209 |
| 2008/0031542 A1 * | 2/2008 | Lei | ................................. | 382/283 |

(Continued)

OTHER PUBLICATIONS

Guerrero, M. "A Comparative Study of Three Image Matcing Algorithms: Sift, Surf, and Fast" Utah State University Merrill-Cazier Library Jan. 1, 2011 pp. 1-121.*

(Continued)

*Primary Examiner* — Chan Park
*Assistant Examiner* — Mia M Thomas
(74) *Attorney, Agent, or Firm* — Hauptman Ham, LLP

(57) ABSTRACT

Disclosed herein is a method of fast image matching that includes the steps as follows. A template image with a predetermined angular orientation is compared with template images in the range from 0 to 360 degrees to create an angle prediction table. Next, a testing image is acquired and compared with the template image with the predetermined angular orientation to record the similarity at each position, and a plurality of angles corresponding to the similarity is found from the angle prediction table. Afterwards, the template images of the plurality of angles are respectively compared with the testing image to obtain the highest similarity as a comparison result of the position.

6 Claims, 9 Drawing Sheets

(56) References Cited

U.S. PATENT DOCUMENTS

| | | | | |
|---|---|---|---|---|
| 2009/0310677 | A1* | 12/2009 | Shiodera et al. | 375/240.15 |
| 2009/0310875 | A1* | 12/2009 | Po et al. | 382/236 |
| 2010/0104135 | A1* | 4/2010 | Nakajima | 382/103 |
| 2010/0104181 | A1* | 4/2010 | Lin et al. | 382/167 |
| 2010/0166320 | A1* | 7/2010 | Paquier | 382/209 |
| 2010/0215232 | A1* | 8/2010 | Woo | 382/131 |
| 2010/0310182 | A1* | 12/2010 | Kroepfl et al. | 382/216 |
| 2010/0322494 | A1* | 12/2010 | Fauver et al. | 382/131 |
| 2011/0002549 | A1* | 1/2011 | Ohmori | 382/218 |
| 2011/0080501 | A1* | 4/2011 | Chen | 348/231.3 |
| 2012/0032922 | A1* | 2/2012 | Lin et al. | 345/175 |
| 2012/0093421 | A1* | 4/2012 | Kletter | 382/209 |
| 2012/0163625 | A1* | 6/2012 | Siotis et al. | 381/92 |
| 2012/0269446 | A1* | 10/2012 | Nakajima | 382/201 |
| 2012/0321134 | A1* | 12/2012 | Shen et al. | 382/103 |
| 2013/0027511 | A1* | 1/2013 | Takemura et al. | 348/42 |
| 2013/0070115 | A1* | 3/2013 | Yang et al. | 348/222.1 |
| 2013/0322772 | A1* | 12/2013 | Seo et al. | 382/209 |
| 2014/0112265 | A1* | 4/2014 | Ryu | 370/329 |
| 2014/0212052 | A1* | 7/2014 | Wei | 382/216 |
| 2015/0098659 | A1* | 4/2015 | Huang | 382/204 |
| 2015/0142884 | A1* | 5/2015 | Veramendi | 709/204 |

OTHER PUBLICATIONS

Wu et al. "Speed-up Template Matching through Integral Image based Weak Classifiers" Journal of Pattern Recognition Research 1 (Jan. 2014) 1-12.*

Vidugirienė et al. "Steering angle prediction using neural networks and look-up table for different drivers" Photonics Applications in Astronomy, Communications, Industry, and High-Energy Physics Experiments 2009, edited by Ryszard S. Romaniuk, Krzysztof S. Kulpa, Proc. of SPIE vol. 7502, 750206 • © 2009 SPIE.*

Tham et al. "A Novel Unrestricted Center-Biased Diamond Search Algorithm for Block Motion Estimation" IEEE Transactions on Circuits and Systems for Video Technology, vol. 8, No. 4, August 1998, pp. 1-9 (369-377).*

Zhu et al. "A New Diamond Search Algorithm for Fast Block-Matching Motion Estimation" IEEE Transactions on Image Processing, vol. 9, No. 2, Feb. 2000, pp. 1-4.*

Sibiryakov, A. "Fast and High-Performance Template Matching Method", IEEE Computer Vision and Pattern Recognition (2011) pp. 1417-1424.*

Huijuan et al. "Fast Image Matching Based-on Improved SURF Algorithm", International Conference on Electronics, Communications and Control (ICECC), 2011 pp. 1-4.*

Cao Ju, et al., "A fast Correlation Method for Image Matching Using Pixels Abstract", 1994-2009 China Academic Journal Electronic Publishing House, Jouranal of Astronautics vol. 25, No. 2, Mar. 2004, pp. 173-178.

Zhang Jimn-min et al., "A Fast Pyramid Image Matching Algorithm Based on Wavelet Decomposition", Jan. 24, 2007, pp. 207-213. http://www.cqvip.com, Abstract Only.

Po, Lai-Man et al.,"A Novel Four-Step Search Algorithm for Fast Block Motion Estimation", IEEE Trans. Circuits Syst. Video Technol., vol. 6, No. 3, pp. 313-317, Jun. 1996.

Choi, Min-Seok, et al., "A Novel Two Stage Template Matching Method for Rotation and Illumination Invariance", Pattern Recognition 35 (2002) 119-129.

Lewis, J. P., "Fast Normalized Cross-Correlation", Vision Interface, 1995 (reference [10]), 7 pages.

Stefano, Luigi Di, et al., "Fast Template Matching Using Bounded Partial Correlation", Machine Vision and Applications (2003) 13: 213-221.

Wu Xiao-hong, et al., "Fast Template Matching Algorithm Based on Boundary Cross Correlation and Image Integration", Journal of Computer Applications, vol. 29, No. 7, Jul. 2009, pp. 1914-1917, Abstract Only.

Kong Hua-sheng, et al., "Image Matching Based on a Fast Searching Strategy", Systems Engineering an Electronics, vol. 28, No. 11, Nov. 2006, pp. 1628-1630.

Liu Ying, et al., "Improvement of Image Matching Algorithm Based on Gray Correlation", Journal of Applied Optics, vol. 28, No. 5, Sep. 2007, pp. 536-540, Abstract Only.

Wang Jing-dong, et al., "New Scene Matching Method for Arbitrary Rotation", Journal of Nanjing University of Aeronautics & Astronautics, vol. 37, No. 1, Feb. 2005, pp. 6-10, Abstract Only.

Jong, Her-Ming et al., "Pareallel Architectures for 3-Step Hierarchical Search Block-Matching Algorithm", IEEE Transactions on Circuits and Systems for Video Technology, vol. 4, No. 4, Aug. 1994, pp. 407-416.

Tsai, D. M. et al., "Rotation-Invariant Pattern Matching Using Wavelet Decomposition", Department of Industrial Engineering and Management, Yuan-Ze University, Chung-Li, Taiwan, R.O.C., 30 pages.

Xue, Jun et al., "Vector Sum of Circular Projection-Based Rotation Invariance Inspection", Bulletin of Advanced Technology Research, vol. 3, No. 12, Doc. 2009, 3 pages, Abstract Only.

* cited by examiner

| Angle | 0 | 1 | 2 | 3 | | 358 | 359 |
|-------|---|------|------|------|-----|------|------|
| Score | 1 | 0.98 | 0.92 | 0.88 | ... | 0.96 | 0.98 |

510 : Angle Prediction Table

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |
| 21 | 22 | 23 | 24 | 25 |

520 : Testing Image

| 1 | 2 | 10 |
|---|---|----|
| 6 | 7 | 20 |
| 11 | 12 | 25 |

530 : Template Image

| × | × | × | × | × |
|---|---|---|---|---|
| × | 0.97 | × | × | × |
| × | × | × | × | × |
| × | × | × | × | × |
| × | × | × | × | × |

The first comparison result is 0.97

Radius

S420

| 4 | 4 | 3 | 3 | 3 | 4 | 4 |
|---|---|---|---|---|---|---|
| 4 | 3 | 2 | 2 | 2 | 3 | 4 |
| 3 | 2 | 1 | 1 | 1 | 2 | 3 |
| 3 | 2 | 1 | 0 | 1 | 2 | 3 |
| 3 | 2 | 1 | 1 | 1 | 2 | 3 |
| 4 | 3 | 2 | 2 | 2 | 3 | 4 |
| 4 | 4 | 3 | 3 | 3 | 4 | 4 |

S430

| 10 | 80  | 150 | 10 | 80  | 150 | 100 |
|----|-----|-----|----|-----|-----|-----|
| 20 | 90  | 160 | 20 | 90  | 160 | 110 |
| 30 | 100 | 170 | 30 | 100 | 170 | 120 |
| 40 | 110 | 180 | 40 | 110 | 180 | 130 |
| 50 | 120 | 190 | 50 | 120 | 190 | 140 |
| 60 | 130 | 200 | 60 | 130 | 200 | 150 |
| 70 | 140 | 210 | 70 | 140 | 210 | 160 |

Circular Projection Transformation →

| 122.2 | 101.6 | 109.4 |
|-------|-------|-------|

METHOD OF FAST IMAGE MATCHING

RELATED APPLICATIONS

This application claims priority to Taiwan Application Ser. No. 102102775, filed Jan. 25, 2013, which is herein incorporated by reference.

BACKGROUND

1. Field of Invention

The present invention relates to a method of fast image matching.

2. Description of Related Art

An image matching technique relates to determining the similarity between images by a similarity pointer. A general image matching technique relates to comparing two pieces of images, wherein one piece is a template image, and the other piece is a testing image. The comparison is intended to find a best match relation between the two images. A most commonly used image matching technique is Normalized Cross Correlation (NCC), as represented by the following equation. Features of NCC are insensitivity to a light ray change and great resistance to noise interference.

$$r = \frac{\sum_{i=1}^{m}\sum_{j=1}^{n}(W(i,j)-\overline{W})(G(i,j)-\overline{G})}{\sqrt{\sum_{i=1}^{m}\sum_{j=1}^{n}(W(i,j)-\overline{W})^2 \sum_{i=1}^{m}\sum_{j=1}^{n}(G(i,j)-\overline{G})^2}}$$

wherein, r=similarity m, n=size of target windows

W(i, j), G(i, j)=gray-scale values of target windows and search windows $\overline{W}$, $\overline{G}$=gray-scale averages of target windows and search windows The general image matching technique relates to comparing template images in the range from 0 to 360 degrees with a testing image, in order to calculate a tilt angle of an object in the testing image, as illustrated in FIG. 1. This method is also called a brute force which is time-consuming and involves a great deal of data.

Hence, the existing image matching method described above apparently requires a further improvement. To solve the problems above, those of skills in the related fields are seeking for solutions by all efforts, which is in vain that no suitable method has been developed and completed so far. Thus, how to implement faster image matching becomes indeed one of those important research and development topics at present, as well as an improvement target required in all related fields.

SUMMARY

Therefore, a technical solution of the present invention provides a method of fast image matching. The technique adopts an angle prediction method to solve the shortage of the brute force. The angle prediction method relates to creating an angle table before the image matching, and then, during the image matching, calculating a possible tilt angle of an object in the testing image by looking up the table. Thus, angles in need of comparison are reduced such that the fast image matching can be achieved.

In accordance with an embodiment of the present invention, a method of fast image matching includes the following steps: (a) pre-comparing a template image with a predetermined angular orientation with template images in the range from 0 to 360 degrees to create an angle prediction table; (b) acquiring a testing image, comparing the testing image with the template image with the predetermined angular orientation to record the similarity at each position, and finding a plurality of angles corresponding to the similarity from the angle prediction table; and (c) respectively comparing the template images with the plurality of angles with the testing image to obtain the highest similarity.

Furthermore, the step (a) includes: comparing the template image with a predetermined angular orientation of 0 degree with the template images in the range from 0 to 360 degrees to record the comparison results; determining if the comparison has been completed for each degree from 0 to 360; after the comparison has been completed, creating the angle prediction table according to the comparison results.

In the step (b), the similarity of the testing image at a position is a numerical value. In the angle prediction table, the similarity of the template images with the plurality of angles is greater than the value. In addition, the step (c) includes: acquiring the template images with the plurality of angles, comparing the template images with the plurality of angles with the testing image at that position, and outputting the highest similarity after the entire piece of the testing image is compared.

In accordance with another embodiment of the present invention, a method of fast image matching includes the following steps: (a) comparing a template image with a predetermined angular orientation with template images in the range from 0 to 360 degrees to create an angle prediction table; (b) acquiring a testing image, and utilizing a circular projection method to find an area of an object corresponding to the template image in the testing image; (c) comparing the area in the testing image with the template image with the predetermined angular orientation to record the similarity at each position, and finding a plurality of angles corresponding to the similarity from the angle prediction table; and (d) respectively comparing the template images with the plurality of angles with the testing image to obtain the highest similarity.

Furthermore, the step (a) includes: comparing the template image with the predetermined angular orientation of 0 degree with the template images in the range from 0 to 360 degrees to record the comparison results; determining if the comparison has been completed for each degree from 0 to 360; after the comparison has been completed, creating the angle prediction table according to the comparison results.

In the step (c), the similarity of the testing image at a position is a numerical value. In the angle prediction table, the similarity of the template images with the plurality of angles is greater than the value. In addition, the step (d) includes: acquiring the template images with the plurality of angles, comparing the template images with the plurality of angles with the testing image at that position, and outputting the highest similarity after the area in the testing image is compared.

In accordance with yet another embodiment of the present invention, a method of fast image matching includes the following steps: (a) pre-comparing a template image with a predetermined angular orientation with template images in the range from 0 to 360 degrees to create an angle prediction table; (b) acquiring a testing image, utilizing the hopscotch method to compare the testing image with the template image with the predetermined angular orientation to record the similarity at each hopscotch position, and finding a plurality of angles corresponding to the similarity from the angle prediction table; (c) respectively comparing the template images with the plurality of angles with the testing image to obtain the highest similarity.

Furthermore, the step (a) includes: comparing the template image with the predetermined angular orientation of 0 degree with the template images in the range from 0 to 360 degrees to record the comparison results; determining if the comparison has been completed for each degree from 0 to 360; after the comparison has been completed, creating the angle prediction table according to the comparison results.

In the step (b), the similarity of the testing image at a hopscotch position is a numerical value. In the angle prediction table, the similarity of the template images with the plurality of angles is greater than the value. In addition, the step (c) includes: acquiring the template images with the plurality of angles, comparing the template images with the plurality of angles with the testing image at that hopscotch position, and outputting the highest similarity after the entire piece of the testing image is compared.

In accordance with still another embodiment of the present invention, a method of image matching includes the following steps: (a) comparing a template image with a predetermined angular orientation with template images in the range from 0 to 360 degrees to create an angle prediction table; (b) acquiring a testing image, and utilizing the circular projection method to find an area of an object corresponding to the template image in the testing image; (c) utilizing the hopscotch method to compare the area in the testing image with the template image with the predetermined angular orientation to record the similarity at each hopscotch position, and finding a plurality of angles corresponding to the similarity from the angle prediction table; (d) respectively comparing the template images with the plurality of angles with the testing image to obtain the highest similarity.

Furthermore, the step (a) includes: comparing the template image with a predetermined angular orientation of 0 degree with the template images in the range from 0 to 360 degrees to record the comparison results; determining if the comparison has been completed for each degree from 0 to 360; after the comparison has been completed, creating the angle prediction table according to the comparison results.

In the step (c), the similarity of the testing image at a hopscotch position is a numerical value. The similarity of the template images with the plurality of angles in the angle prediction table is greater than the value. In addition, the step (d) includes: acquiring the template images with the plurality of angles, comparing the template images with the plurality of angles with the testing image at that hopscotch position, and outputting the highest similarity after the area in the testing image is compared.

In view of the above, the technical solution provided by the present invention has obvious advantages and beneficial effects compared with the prior art. The technical solution described above is helpful to considerable technical improvements, and is of great value on widely industrial applications, wherein the technical solution provided by the present invention has at least the following advantages:

1. data calculation amount is dramatically reduced; and
2. the image matching speed is increased.

The aforesaid description will be described in details through the following embodiments, and the technical solution provided by the present invention will be further explained.

BRIEF DESCRIPTION OF THE DRAWINGS

In order to make the foregoing as well as other aspects, features, advantages, and embodiments of the present invention more apparent, the accompanying drawings are described as follows:

FIG. 5 is a schematic view depicting the method of FIG. 4;

DETAILED DESCRIPTION

Figure 1:
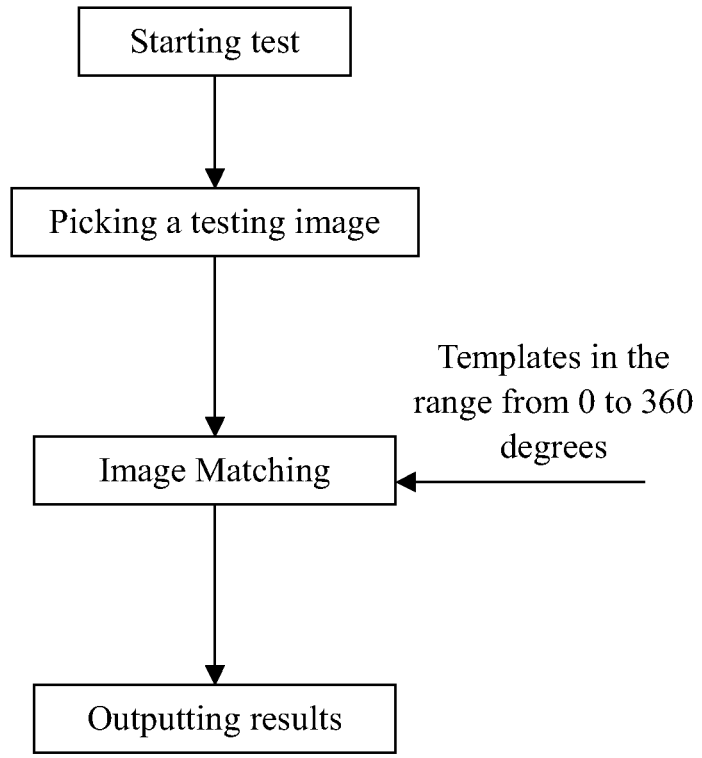
FIG. 1 is a flow chart depicting a conventional method of image matching.

In order to make the description of the invention more detailed and more comprehensive, various embodiments are described below with reference to the accompanying drawings. The same reference numbers are used in the drawings to refer to the same or like elements. Additionally, well-known elements and steps are not described in the embodiments to avoid causing unnecessary limitations to the invention.

Figure 2:
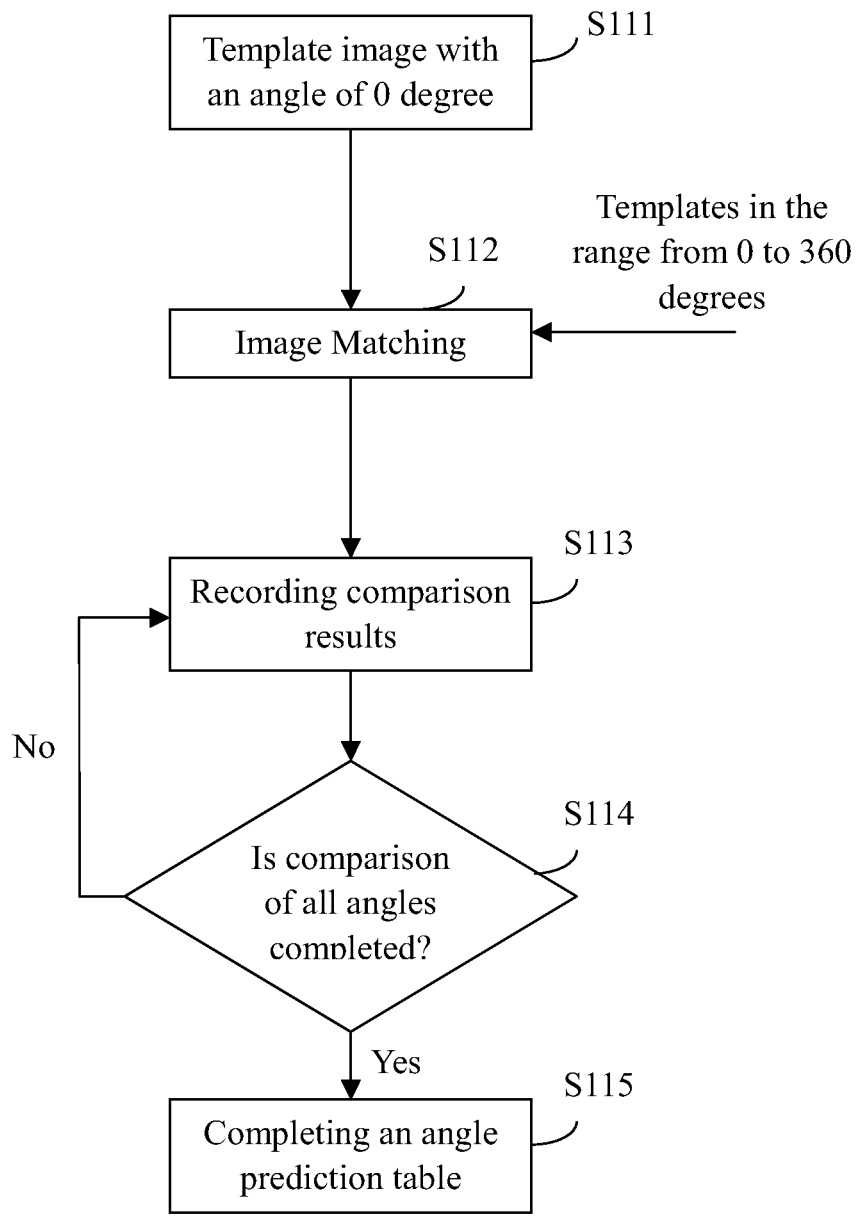
FIG. 2 is a flow chart depicting the creation of an angle prediction table during a method of image matching in accordance with an embodiment of the present invention.
Figure 3:
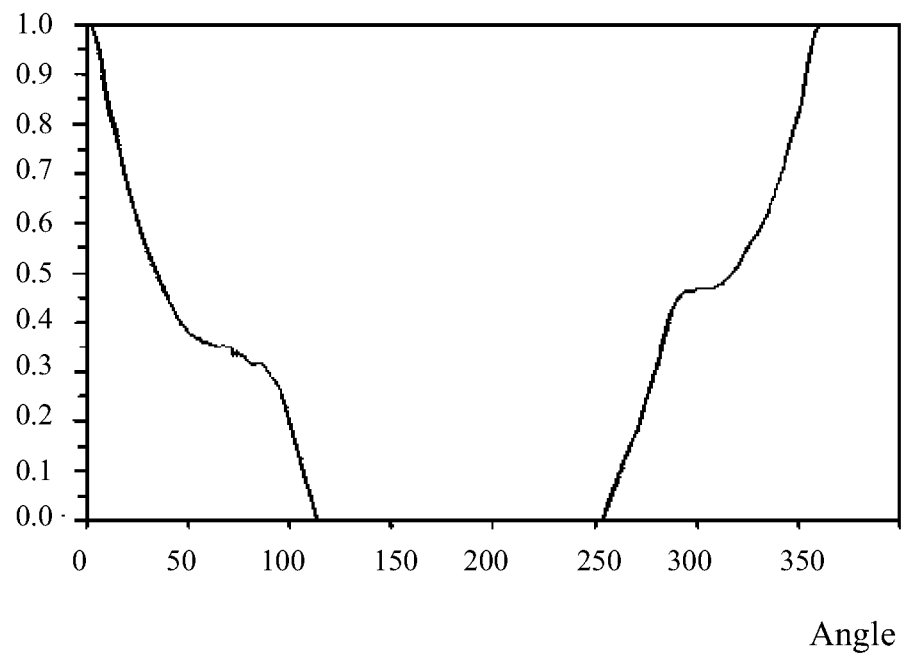
FIG. 3 is an angle prediction table in accordance with an embodiment of the present invention.

The technical solution provided by the present invention is a method of fast image matching. The technical solution is applicable to testing benches or widely used in related technical steps. It should be noticed that the image matching process of the technical solution can be divided into two stages. Stage 1 relates to creating an angle prediction table and calculating related parameters to be used during the image matching (as illustrated in FIGS. 2-3). Stage 2 relates to using the angle prediction table to increase the image matching speed (as illustrated in FIGS. 4-9).

FIG. 2 is a flow chart depicting the creation of an angle prediction table during a method of image matching in accordance with an embodiment of the present invention. As illustrated in FIG. 2, before a formal comparison of the testing image, a template image with a predetermined angular orientation (such as 0 degree) may be compared with template images in the range from 0 to 360 degrees to create an angle prediction table. It should be understood that all "steps" mentioned herein, unless of which the sequence is specified, may be sorted according to actual requirements, and even all or part of the steps may be performed simultaneously.

Particularly, in the step S111, a template image with a predetermined angular orientation of 0 degree is provided. In the step S112, the template image with the angle of 0 degree is compared with template images in the range from 0 to 360 degrees in order to record the comparison results in the step S113. Next, in the step S114, it is determined if the comparison has been completed for each degree from 0 to 360. After the comparison has been completed, in the step S115, the angle prediction table is created according to the comparison results; otherwise, the flow is back to the step S113 if the comparison has not been completed.

FIG. 3 relates to an angle prediction table in accordance with an embodiment of the present invention. As illustrated in FIG. 3, when an angle is closer to 0 or 360, the deflecting range of the template image is smaller, and thus the similarity is closer to 1.

Figure 4:
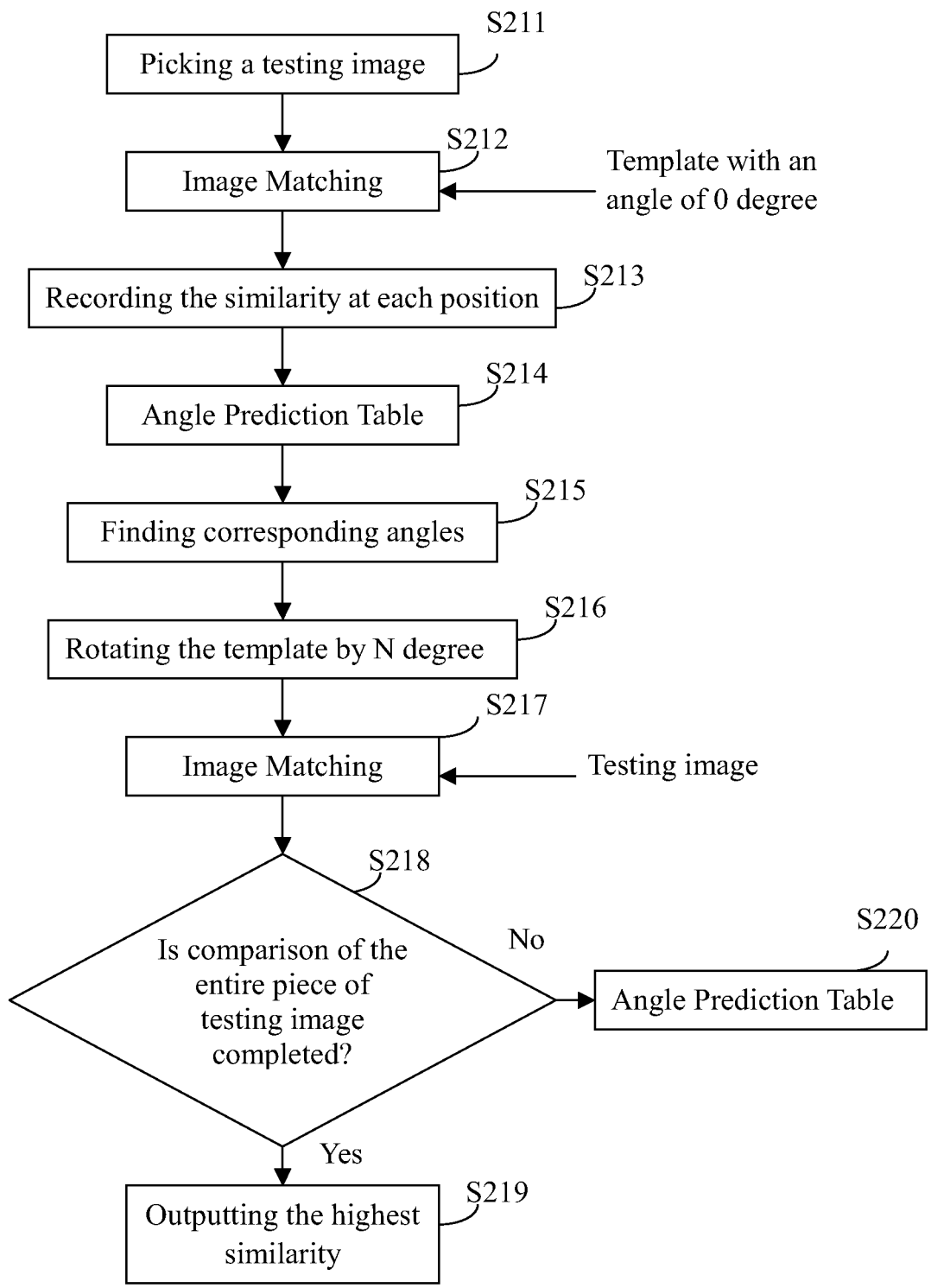
FIG. 4 is a flow chart depicting the usage of the angle prediction table in accordance with an embodiment of the present invention.

The created angle prediction table can be used to perform the fast image matching. Referring to FIG. 4, it is a flow chart depicting the usage of the angle prediction table in accordance with an embodiment of the present invention. As illustrated in FIG. 4, firstly, a testing image is acquired in the step S211, and in the step S212, the testing image is compared with the template image with the predetermined angular orientation (such as 0 degree) in order to record the similarity at each position in the step S213. Then, the angle prediction table is used in the step S214, and further a plurality of angles corresponding to the similarity is found from the angle prediction table in the step S215. After that, template images with the plurality of angles are respectively compared with the testing image in the steps S216-S219 to obtain the highest similarity.

Particularly, in the steps S214-S215 the similarity of the testing image at a position is a numerical value. The similarity of the template images with the plurality of angles in the angle prediction table is greater than the value. In addition, the template images are respectively rotated by N degree based on the plurality of angles in the step S216, and the template images with the plurality of angles are acquired and compared with the testing image at the position in the step S217, and then it is determined if the entire piece of the testing image is compared in the step S218. After the entire piece of the testing image is compared, the highest similarity is output in the step S219; otherwise, if the entire piece of the testing image has not been completely compared, the angle prediction table is used continually in the step S220 to make further comparison.

The aforesaid method of FIG. 4 is illustrated in details by reference to FIG. 5. During the image matching, a testing image 520 is firstly compared pixel by pixel with a template image 530 with an angle of 0 degree, and the similarity is recorded for each turn of comparison till the entire piece of the testing image is compared. Then, the similarity of the testing image at each position is acquired, and angles corresponding to the similarity are found by looking up the angle prediction table. For example, if the similarity value of the testing image 520 at a position (20,50) is 0.97, the angles, with which the templates have the similarity greater than 0.97, are required to look up in the angle prediction table 510. Next, the template images with the angles (i.e., 0 degree, 1 degree, and 359 degree) are acquired and compared with the testing image at the position (20,50), and then the entire piece of the testing image is compared in this way until the highest similarity is obtained as the final result.

Figure 6:
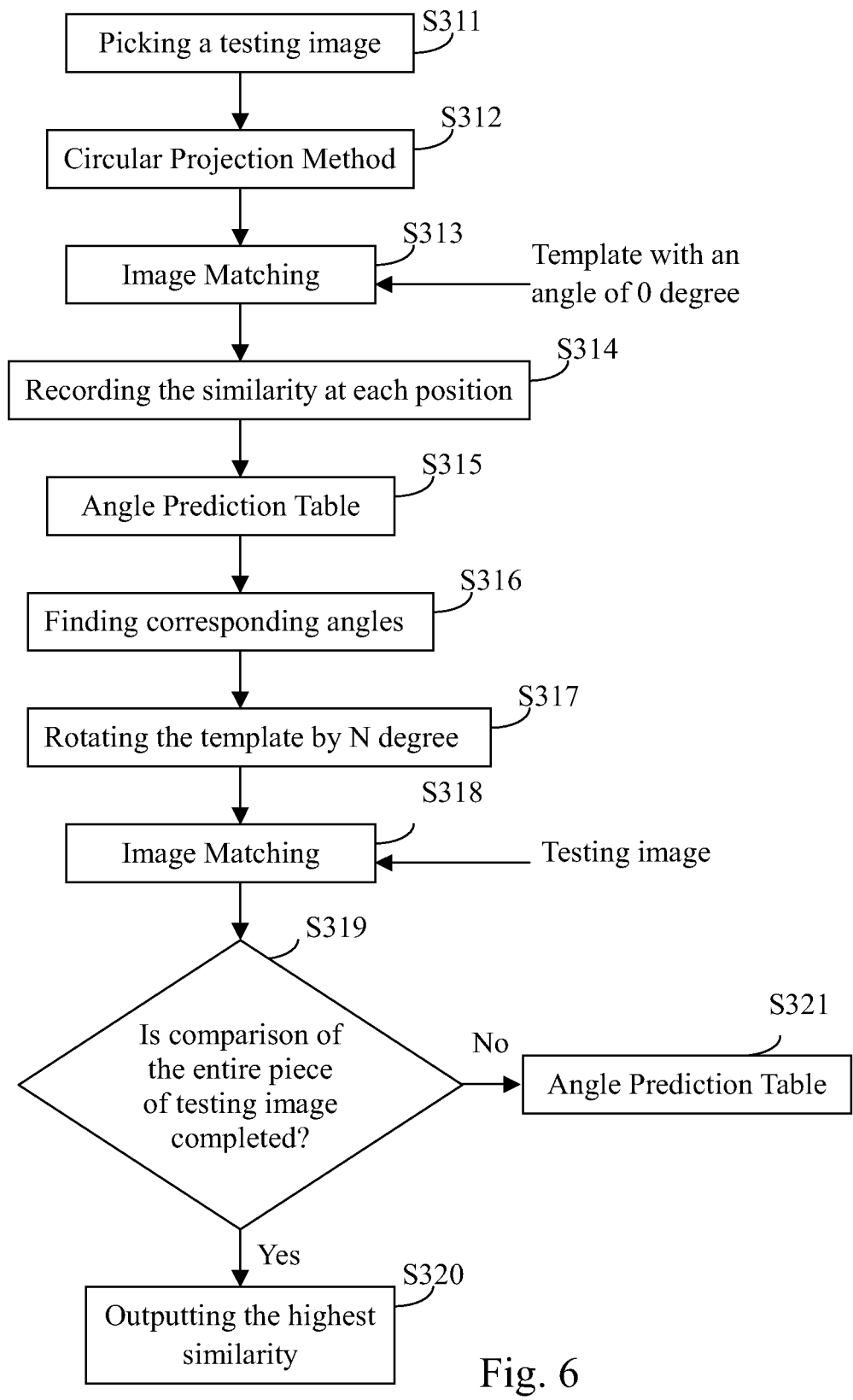
FIG. 6 is a flow chart depicting the usage of the angle prediction table in accordance with another embodiment of the present invention.

Additionally, the method of using the angle prediction table in the technique solution may be combined with the circular projection method. As illustrated in FIG. 6, firstly, a testing image is acquired in the step S311, and then the circular projection method is utilized to find an area (that is an approximate position) of an object corresponding to the template image in the testing image in the step S312. In the step S313, this area in the testing image is compared with the template image with the predetermined angular orientation (such as 0 degree) in order to record the similarity at each position in the step S314. Then, the angle prediction table is used in the step S315, and further a plurality of angles corresponding to the similarity is found from the angle prediction table in the step S316. After that, template images with the plurality of angles are respectively compared with the testing image in the steps S317-S320 to obtain the highest similarity.

Particularly, in the steps S315-S316, the similarity of the testing image at a position is a numerical value. The similarity of the template images with the plurality of angles in the angle prediction table is greater than the value. In addition, the template images are respectively rotated by N degree based on the plurality of angles in the step S317, and the template images with the plurality of angles are acquired and compared with the testing image at the position in the step S318, and then it is determined if the entire piece of the testing image is compared in the step S319. After the entire piece of the testing image is compared, the highest similarity is output as the result in the step S320; otherwise, if the entire piece of the testing image has not been completely compared, the angle prediction table is used again in the step S321 to make further comparison.

Figure 7:
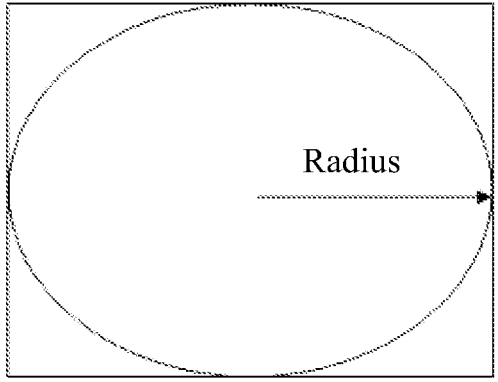
FIG. 7 is a schematic view depicting a circular projection method in accordance with another embodiment of the present invention.

The aforesaid circular projection method is illustrated in details by reference to FIG. 7. Firstly, the radiuses of the template images are calculated in the step S410. Next, a radius table is created in the step S420, wherein the centre is 0 and the radius value grows outwards. Then, a circular projection transformation is performed in the step S430, wherein the pixel of the radius 1 is (170+30+100+180+110+190+50+120)/8=122.5. By the same way, the pixel of the radius 2 is 101.6, and the pixel of the radius 3 is 109.375. In this way, two-dimensional image information can be reduced to a one-dimensional ring space, and the circular projection method is used to acquire the pixel within each radius to perform NCC. Because a gray-scale value on a ring will not grow excessively due to rotation no matter how the object rotates, this characteristic helps to perform the image matching to find an appropriate position of the object within the testing image.

Figure 8:
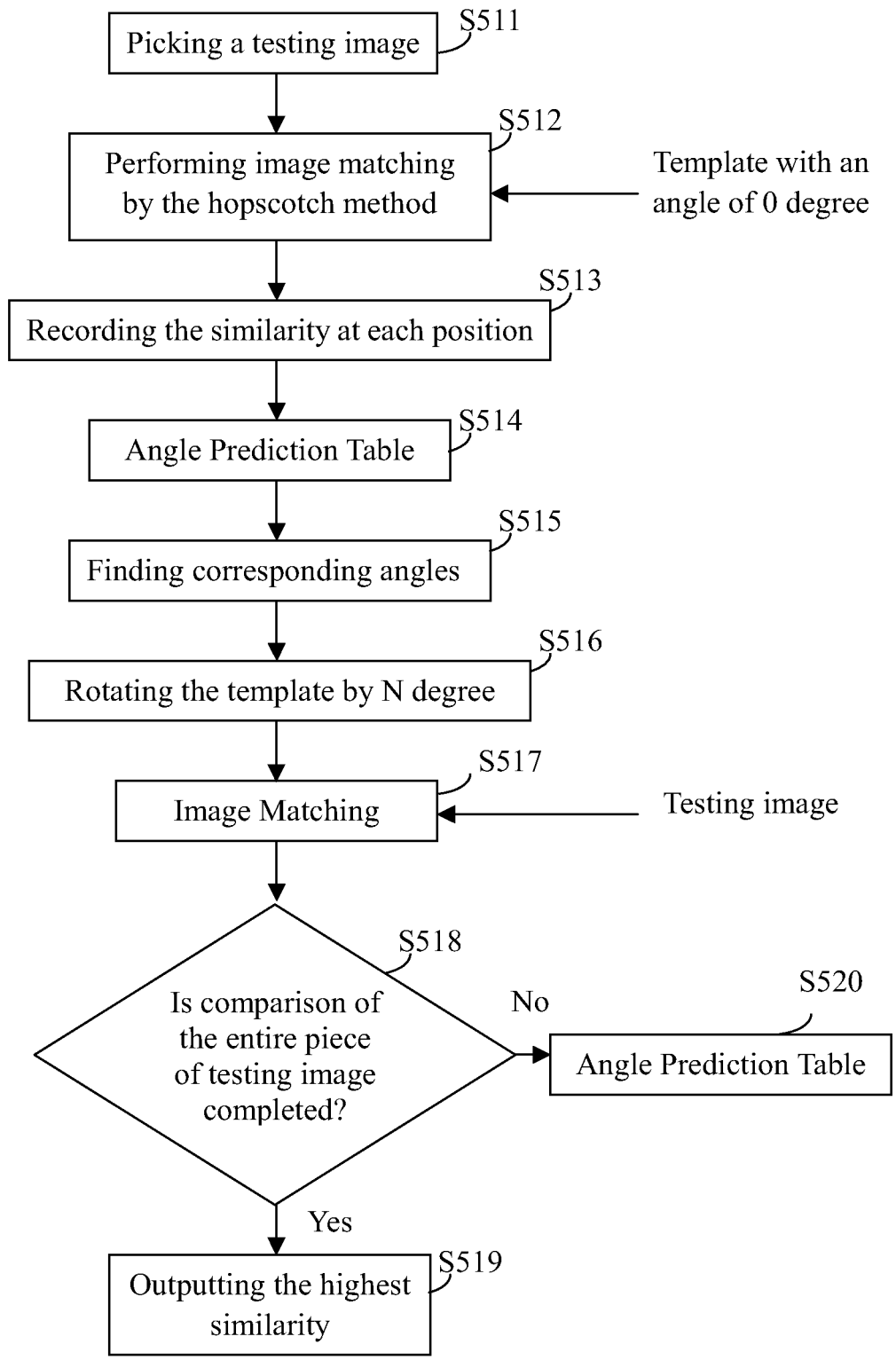
FIG. 8 is a flow chart depicting the usage of the angle prediction table in accordance with yet another embodiment of the present invention.

Additionally, the method of using the angle prediction table in the technique solution may be combined with the hopscotch method. As illustrated in FIG. 8, firstly, a testing image is acquired in the step S511, and then the hopscotch method is utilized to compare the testing image with the template image with the predetermined angular orientation (such as 0 degree) in the step S512 in order to record the similarity at each hopscotch position in the step S513. Then, the angle prediction table is used in the step S514, and further a plurality of angles corresponding to the similarity is found from the angle prediction table in the step S515. After that, the template images with the plurality of angles are respectively compared with the testing image in the steps S516-S519 to obtain the highest similarity.

Particularly, in the steps S514-S515, the similarity of the testing image at a hopscotch position is a numerical value. The similarity of the template images with the plurality of angles in the angle prediction table is greater than the value. In addition, the template images are respectively rotated by N degree based on the plurality of angles in the step S516, and the template images with the plurality of angles are acquired and compared with the testing image at the hopscotch position in the step S517, and then it is determined if the entire piece of the testing image is compared in the step S518. After the entire piece of the testing image is compared, the highest similarity is output in the step S519; otherwise, if the entire piece of the testing image has not been completely compared, the angle prediction table is used continually in the step S520 to make further comparison.

In practice, the aforesaid hopscotch method may be three-step search algorithm, diamond search algorithm, an interlaced hopscotch method, or other regular hopscotch methods. Since each of various hopscotch methods can only be performed efficiently only under a distinct and specific condition, those skilled in the art should flexibly choose a suitable hopscotch method according to the actual requirements.

Figure 9:
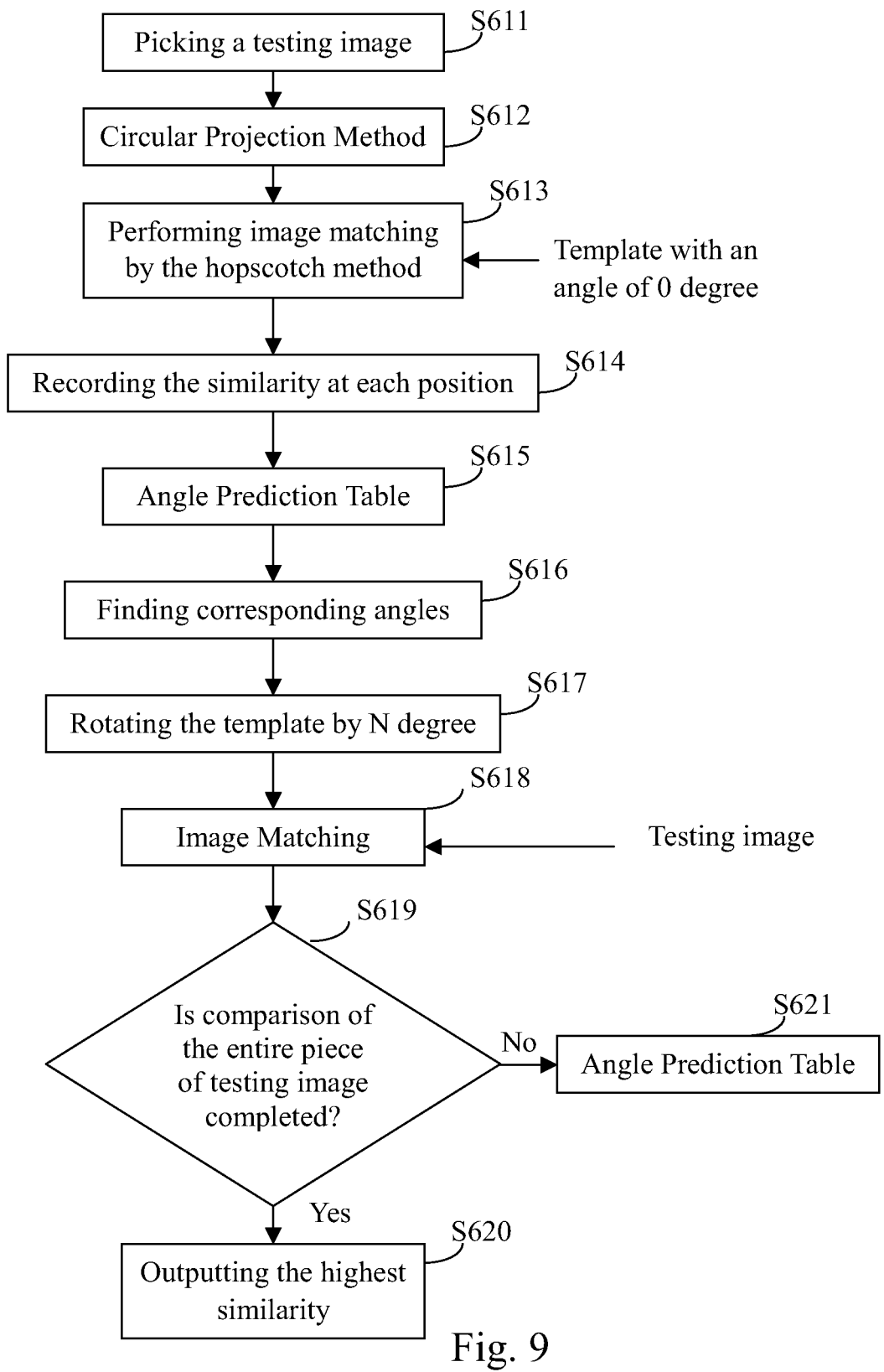
FIG. 9 is a flow chart depicting the usage of the angle prediction table in accordance with still another embodiment of the present invention.

Additionally, the method of using the angle prediction table in the technique solution may be combined with the hopscotch method and the circular projection method. As illustrated in FIG. 9, firstly, a testing image is acquired in the step S611, and then the circular projection method is utilized to find an area (that is an approximate position) of an object corresponding to the template image in the testing image in the step S612. In the step S613, the hopscotch method is utilized to compare this area in the testing image with the template image with the predetermined angular orientation (such as 0 degree) to record the similarity at each hopscotch position in the step S614. Then, the angle prediction table is used in the step S615, and further a plurality of angles corresponding to the similarity is found from the angle prediction table in the step S616. After that, the template images with the plurality of angles are respectively compared with the testing image in the steps S617-S620 to obtain the highest similarity.

Particularly, in the steps S615-S616 the similarity of the testing image at a hopscotch position is a numerical value. The similarity of the template images with the plurality of angles in the angle prediction table is greater than the value. In addition, the template images are respectively rotated by N degree based on the plurality of angles in the step S617, and the template images with the plurality of angles are acquired and compared with the testing image at the hopscotch position in the step S618, and then it is determined if the entire piece of the testing image is compared in the step S619. After the entire piece of the testing image is compared, the highest similarity is output as the result in the step S620; otherwise, if the entire piece of the testing image has not been completely compared, the angle prediction table is used continually in the step S621 to make further comparison.

In conclusion, the experimental data of the technique solution is as illustrated in the following Table 1 and Table 2. Table 1 relates to the speed comparison of the image matching respectively performed by using the brute force, the hopscotch method, the circular projection method, and the angle prediction method. It can be seen from Table 1 that the method of the present invention (i.e., the angle prediction method) can increase the matching speed more efficiently than the hopscotch method and circular projection method. In addition, the method of the present invention can also be combined with, or independent from, the hopscotch method and the circular projection method. As illustrated in Table 2, the method 1 is the combination of the method of the present invention and the hopscotch method; the method 2 is the combination of the method of the present invention and the circular projection method; and the method 3 is the combination of the method of the present invention, the hopscotch method and the circular projection method. It can be seen from Table 2 that a better image matching effect can be achieved through the combination of the method provided by the present invention, the hopscotch method and the circular projection method.

TABLE 1

Performance Comparison of Algorithm

|  | Testing Image Size | Template Image Size | Offset Angle | Brute Force | Hopscotch Method | Circular Projection Method | Method of the Present Invention |
|---|---|---|---|---|---|---|---|
| Test 1 | 1024 × 767 | 157 × 140 | 30 | 26892 sec. | 0.671 sec. | 0.515 sec. | 0.203 sec. |
| Test 2 | 800 × 600 | 184 × 169 | 15 | 20232 sec. | 0.594 sec. | 0.344 sec. | 0.313 sec. |
| Test 3 | 970 × 649 | 343 × 317 | 10 | 68746 sec. | 0.265 sec. | 0.281 sec. | 0.25 sec. |
| Test 4 | 1000 × 1000 | 187 × 164 | 72 | 47218 sec. | 1.281 sec. | 1.015 sec. | 0.359 sec. |
| Test 5 | 1440 × 900 | 216 × 223 | 8 | 76519 sec. | 2.42 sec. | 2.171 sec. | 0.847 sec. |
| Test 6 | 1100 × 800 | 365 × 249 | 188 | 69945 sec. | 1.796 sec. | 1.047 sec. | 0.985 sec. |

TABLE 2

Performance Comparison of Combined Algorithm

|  | Testing Image Size | Template Image Size | Offset Angle | Method 1 | Method 2 | Method 3 |
|---|---|---|---|---|---|---|
| Test 1 | 1024 × 767 | 157 × 140 | 30 | 0.172 sec. | 0.141 sec. | 0.109 sec. |
| Test 2 | 800 × 600 | 184 × 169 | 15 | 0.281 sec. | 0.141 sec. | 0.1094 sec. |
| Test 3 | 970 × 649 | 343 × 317 | 10 | 0.234 sec. | 0.187 sec. | 0.141 sec. |
| Test 4 | 1000 × 1000 | 187 × 164 | 72 | 0.343 sec. | 0.344 sec. | 0.312 sec. |
| Test 5 | 1440 × 900 | 216 × 223 | 8 | 0.796 sec. | 0.85 sec. | 0.641 sec. |
| Test 6 | 1100 × 800 | 365 × 249 | 188 | 0.562 sec. | 0.47 sec. | 0.343 sec. |

In practice, specific embodiments of the method of the present invention described above can be performed by using software, hardware and/or firmware. For example, if the performing speed and accuracy are the first consideration, the hardware and/or firmware can be mainly used for the units; if the design flexibility is the first consideration, the software can be mainly used for the units; or, the software, hardware and firmware can be adopted at the same time for the units. It should be understood that, no preference exists among the examples listed above, and the aforesaid examples are not intended to limit the present invention. Those skilled in the art should flexibly choose from the specific embodiments of the method of the present invention according to actual requirements.

Although the present invention has been disclosed with reference to the above embodiments, these embodiments are not intended to limit the present invention. It will be apparent to those skilled in the art that various modifications and variations can be made without departing from the scope or spirit of the present invention. Therefore, the scope of the present invention shall be defined by the appended claims.

What is claimed is:

1. A method of fast image matching, comprising:
   (a) using a computer for pre-comparing a template image having a predetermined angular orientation with the template images rotated in a range from 0 to 360 degrees respectively, so as to create an angle prediction table;
   (b) using the computer for acquiring a testing image, comparing the testing image to the template image having the predetermined angular orientation so as to record at least one similarity between each portion of the testing image and the template image, wherein a size of the each portion of the testing image is equal to a size of the template image, and finding a plurality of angles from the angle prediction table, wherein the plurality of angles in the angle prediction table have respective scores that are greater than the at least one similarity; and
   (c) using the computer for comparing each of the template images associated with the plurality of angles respectively to the testing image so as to obtain a highest similarity.

2. The method of fast image matching of claim 1, wherein the step (a) comprises:
   comparing the template image with a predetermined angular orientation of 0 degree with the template images in the range from 0 to 360 degrees to record the comparison results;
   determining if the comparison has been completed for each degree from 0 to 360; and
   after the comparison has been completed, creating the angle prediction table according to the comparison results.

3. The method of fast image matching of claim 1, wherein the at least one similarity of each portion of the testing image at each position is a numerical value, and in the angle prediction table the scores of the template images with the plurality of angles is greater than the numerical value; in addition, the step (c) comprises: acquiring the template images with the plurality of angles, comparing the template images with the plurality of angles with the testing image at the each position, and outputting the highest similarity after an entire piece of the testing image is compared.

4. A method of fast image matching, comprising:
   (a) using a computer for comparing a template image having a predetermined angular orientation with the template images rotated in a range from 0 to 360 degrees respectively, so as to create an angle prediction table;
   (b) using the computer for acquiring a testing image, and utilizing a circular projection method to find an area of an object corresponding to the template image in the testing image;
   (c) using the computer for comparing the area in the testing image to the template image having the predetermined angular orientation so as to record at least one similarity between each portion of the testing image and the template image, wherein a size of the each portion of the testing image is equal to a size of the template image, and finding a plurality of angles from the angle prediction table, wherein the plurality of angles in the angle prediction table have respective scores that are greater than the at least one similarity; and
   (d) using the computer for comparing each of the template images associated with the plurality of angles respectively to the testing image so as to obtain a highest similarity.

5. The method of fast image matching of claim 4, wherein the step (a) comprises:
   comparing the template image with a predetermined angular orientation of 0 degree with the template images in the range from 0 to 360 degrees to record the comparison results;
   determining if the comparison has been completed for each degree from 0 to 360; and
   after the comparison has been completed, creating the angle prediction table according to the comparison results.

6. The method of fast image matching of claim 4, wherein the at least one similarity of each portion of the testing image at each position is a numerical value, and the scores of the template images with the plurality of angles in the angle prediction table is greater than the value; in addition, the step (d) comprises: acquiring the template images with the plurality of angles, comparing the template images with the plurality of angles with the testing image a the each position, and outputting the highest similarity after the area within the testing image is compared.

* * * * *